United States Patent [19]

Owen et al.

[11] 4,034,400
[45] July 5, 1977

[54] APPARATUS FOR REPRODUCING GRAPHIC MATERIAL

[75] Inventors: David Gregory Owen; John Vernon Ashworth; Paul Anthony Beaufort Radcliffe, all of London, England

[73] Assignee: International Publishing Corporation Ltd., London, England

[22] Filed: Dec. 26, 1973

[21] Appl. No.: 428,047

Related U.S. Application Data

[63] Continuation of Ser. No. 179,959, Sept. 13, 1971, abandoned.

[30] Foreign Application Priority Data

Sept. 23, 1970 United Kingdom ............ 45398/70

[52] U.S. Cl. .................... 358/75; 358/256; 358/285; 358/287; 358/293
[51] Int. Cl.² ......................... H04N 1/04
[58] Field of Search ............ 178/6.8, 7.2, DIG. 22, 178/DIG.3, DIG. 6, 7.6, 6.7 A, 6.7 R, 6.6 B, 6.6 R; 358/75, 80, 77; 340/172.5

[56] References Cited

UNITED STATES PATENTS

| | | | |
|---|---|---|---|
| 2,691,696 | 10/1954 | Yule | 358/80 |
| 2,721,892 | 10/1955 | Yule | 358/80 |
| 3,557,303 | 1/1971 | Jordan | 358/80 |
| 3,828,319 | 8/1974 | Owen et al. | 340/172.5 |

*Primary Examiner*—John C. Martin
*Attorney, Agent, or Firm*—Brisebois & Kruger

[57] ABSTRACT

This invention relates to apparatus for the reproduction of graphic material which is capable of operating a photo-composing device for reproducing the graphic material as an image on a photosensitive surface. The apparatus scans the graphic material with a light spot associated with a photosensitive device to produce an electrical output signal modulated according to the graphic information and which is employed to reproduce the graphic information on the photo-composing device. Control means are provided for positioning the scanning light spot at the start of each scan according to predetermined co-ordinates, whereby any scan can be commenced at any desired point on any item of graphic material within the field of scan of the light spot.

18 Claims, 6 Drawing Figures

APPARATUS FOR REPRODUCING GRAPHIC MATERIAL

This application is a continuation of Application Ser. No. 179,959, now abandoned, filed Sept. 13, 1971 by David Gregory Owen, John Vernon Ashworth, and Paul Anthony Beaufort Radcliffe, for Apparatus for Reproducing Graphic Material, now abondoned. The applicants claim priority of Great Britain Application 45398/70 dated Sept. 23, 1970.

This application includes and has incorporated herein the disclosure of now abandoned copending United States application Ser. No. 43,695 filed June 5, 1970, now abandoned, for Composition System and its copending priority Great Britain application 31,645/69 dated June 23, 1969, which is referenced in the present case and in the parent application Ser. No. 179,959.

This application is related to copending application 284,095 filed Aug. 28, 1972 for Composition System, which is a continuation-in-part of Application Ser. No. 43,695.

The present invention relates to apparatus for the reproduction of graphic material, and which is capable of operating a photo-composing device which reproduces the graphic material as an image on a photosensitive surface from which a printing plate can be obtained to enable the reproduction of printed matter.

The term "graphic material" as used herein includes, photographs or other pictures having gradation of tone, line drawings or other matter without gradation of tone and may also include textual material.

In the printing art various photo-composing systems have been proposed for facilitating the composition of textual matter. In these systems, the composed page is laid down on a sheet of photo-sensitive material from which may be produced a plate for printing on paper or other material. However, in composing a page, for example a newspaper or magazine, it is frequently desired to include graphic material, such as photographs and drawings at any desired positions in the page.

A well known commercially available prior art computer whichis useful in the system of the present invention is the Farranti Argus 500 computer as described in the *Auerback Computer Technology Reports* 180.7310.150 "Ferranti Argus 500" pp 1-9, Auerback Publishers Inc., 1972. The full facility 500 is preferred; other models 500E and 500 L may be used but, as described in page 2 of the report, have limited stores and peripherals.

Well known commercially available computer buffer stores are useful with the system of the present invention.

Well known cathode ray tubes, herein referred to as CRT facsimile devices to indicate their well known display functions, are used as indicated in the present system.

Well known commercially available Muirhead Fascimile Receiver devices are useful in the present system, such as for example fascimile devices shown and described in British Patent Specifications 766,004 (1957), 1,125,059 (1968), and 1,011,158 (1965).

Our co-pending application No. 31645/69 describes a system for the composition of typescript or other material which includes the facility of incorporating graphic material in the composition. The present invention provides apparatus for the reproduction of graphic material which may be used inter alia in conjunction with a system as described in the aforementioned copending application.

The following description from British Specification 31645/69 filed June 23, 1969 present invention relates to a system for the composition of typescript and also, if desired, graphic material.

From one aspect that invention consists in a system for the composition of typescript or other material form electronic signals generated in a computer and including a facsimile device, operated by the output from the computer, and which reproduces the typescript or other material as an image by means of linear scans, wherein converter means are provided to compensate for the varying time durations of the operations performed by the computer so that the output signals fed to the facsimile device are in a form suitable for reproduction by the facsimile device of the typescript or other material.

The invention also consists in a system for the composition of typescript or other material from electronic signals generated in a computer, wherein said signals are employed to operate a facsimile device in which the typescript or other material is reproduced as an image on a carrier, such as a photograhic film, by means of linear scans and wherein the output signals from the computer are fed through a buffer and a converter device which serve to compensate for the varying time durations of the different computer operations and to convert the signals into a form suitable for reproduction of the typescript or other material by the facsimile device during its successive scanning lines.

According to a feature of the invention, the signals [from the computer] to the converter are in the form of run-length coding which enables the time taken for the issue of commands [from the computer] relating to the composition of each scan of typescript to be substantially reduced.

According to one embodiment of the invention a computer includes a buffer store having two separate storage areas, each area being sufficiently large to hold the run-length coding counts for one complete line scan at the facsimile receiver. The two areas of the buffer store are used in such a fashion that whilst the converter is extracting signals from one area to create one line scan, the computer is filling the other area with sufficient counts to cover the next line scan. When a line scan has been reproduced at the receiver, a signal originating form the receiver or the converter is sent to the computer to cause the computer to fill the area of the buffer store which has been emptied, while the converter extracts the signals applicable to the next line scan from the other area of the buffer store. It will be appreciated that more than two buffer storage areas may be provided to which signals are fed and extracted in sequence.

Two signal channels may be provided between the computer and the converter, each channel originating in the computer as either of two alternative areas of the buffer store. One of the channels representing the typescript information feeds a series of registers in the converter which are connected to form a "push-down" store and which are kept filled with signals from the computer. The other channel also feeds a further series of registers in the converter in a manner controlled by the signals in the first channel and which registers contain signals respectively related to different segments of a line scan and also control words used for merging the output signals from the two channels.

Alternatively the computer buffer store may be operated in a cyclic mode. In such an arrangement, the run-length coding counts for each line scan terminate in a uniquely identifiable word, and the computer logic is such as to prevent overlapping of successive line scans. Several line scans may be in the store at any one time, and as one line scan is being fed out, another line scan may be built up by the computer.

In a further arrangement, control words may be interspersed with words containing run-length counts employed for the composition of the text.

Means may also be provided for feeding electronic signals representing graphic material from a suitable signal source, such as a facsimile transmitter, either to the converter or direct to the facsimile device. The control words may be employed for the production or insertion of pattern or graphic material into the output signals representing text.

The facsimile device may be a facsimile receiver which is adapted to support a photosensitive carrier, such as a film, and to be scanned in a linear fashion by a light spot modulated with the information signals to be recorded. Alternatively, the facsimile device may be a cathode ray tube whose scanning lines and is modulated with the information signals.

The disclosure of the British case invention will now be further described, by way of exaple, with reference to the accompanying drawings, in which:

The systems to be specifically described are intended for the production of an image of typescript and graphic material on a carrier, such as a photograhic film, from which a printing plate can be produced to enable the reproduction of printed matter on paper, e.g. one or more pages of a newspaper, magazine or book. The image of the typescript and graphic material may also be reproduced on a cathode ray tube.

Figure 1A:
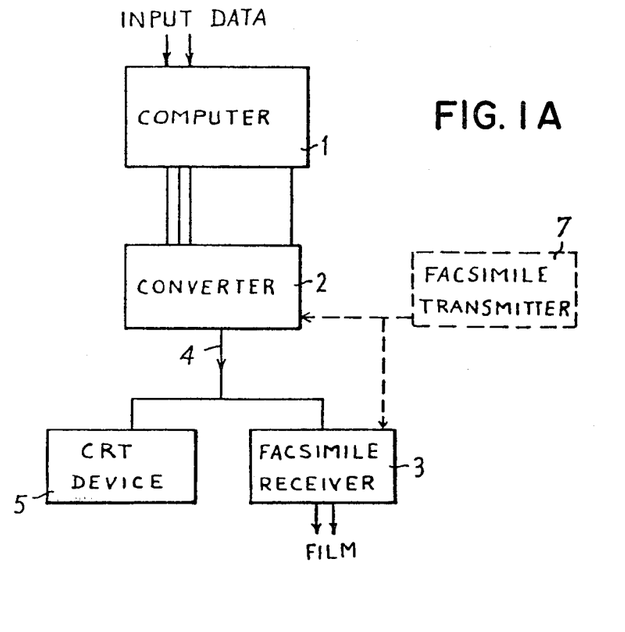
FIG. 1A is a simple block diagram of one embodiment of the system according to this invention.

As shown in FIG. 1A, the system basically comprises a computer 1A, whose output feeds a converter 2A, which in turn feeds a facsimile receiver 3A over a signal channel 4A. The signals from channel 4A may alternatively or additionally be fed to a cathode ray tube facsimile device 5A having a storage type screen on which an image formed from a plurality of scanning lines can be reproduced and remains visible for viewing for an appreciable time period, e.g. several minutes. It will be understood that the facsimile receiver 3A can be located remote from the computer 1A and converter 2A, and the signal channel 4A can be a line connection or radio link of a suitable bandwidth for the signals to be passed from the converter to the facsimile receiver. Where graphic material is to be included, the system also includes a facsimile transmitter or other scanning device 7A whose output may be fed into either the converter 2A or direct to the facsimile receiver 3A.

The input data to the computer 1A may be obtained from a keyboard, or from a recording medium such as punched paper tape or magnetic tape, or alternatively may be obtained from another computer which accepts and processes test and other information, and interprets any corrections and instructions regarding the make-up of the page to be reproduced. The computer 1A may be provided with a store for the characters to be printed, and also determine character spacing, vertical and horizontal justification, as well as other processes associated with the assembly of the printed text into the desired columns or areas.

The system to be described has been successfully operated employing a Ferranti Argus 500 computer for the computer and a Muirhead "Pagefax" receiver for the facsimile receiver. The converter 2A generates clock pulses which are synchronized with the rotation of the drum of the facsimile receiver, which in this embodiment rotates at a speed of 2400 r.p.m.

A vertical line-scan density of 400 lines per inch was chosen for this system, with a horizontal definition of 1600 elements per inch. At these definition standards, on a page having a printing area 22 inches wide and 15 inches deep, for example, there are 6000 line scans each of 36 thousand units, making a total number of units in the order of two hundred million per page. The use of a horizontal standard of 1600 units per inch was dictated by the desire to provide a good standard of reproduction of sloping and curved lines forming typographic characters.

The method of comuter output chosen for the bulk of the material —e.g. typescript— is run-length-coding. This representation of the information content of a line-scan takes the form of a sequence of numerical counts expressing the lengths of successive portions of black and white image.

Although the scanning velocity of the facsimile receiver is constant, i.e. each line scan takes precisely the same time, the time taken for the issue of commands by the computer concerning the composition of each scan is radically reduced by the use of run-length-coding, which materially eases the load on the computer. For example, in the case of the reproduction of a completely white line across the page, the computer has merely to utter a few large white counts and the converter 2A occupies the whole duration of the line to count down these numbers. During the balance of this time, the computer is free to perform other operations. The function of the converter is thus to transform run-length-coding commands from the computer into lengths of black and white actually to be reproduced at the receiver.

A device for scanning graphic material and operating in synchronism with the facsimile receiver 3A may be provided to allow for the combination of such graphic material with the text image. The use of such a device, which may be a facsimile transmitter 7A, avoids the necesity to store the graphic information in the computer.

Signals from pictures assembled in their correct positions upon the drum of the facsimile transmitter 7A, which runs in synchronism with the drum of the facsimile receivr 3A, may be gated into the input of converter 2A at appropriate times. Such pictures can be optically pre-screened, or alternatively, electronically screened during the transmission process in order to produce the required half-tone characteristics.

Provided that the relative positions of the two images, i.e. the typescript form the computer 1A and the graphic material from the facsimile transmitter 7A, are correct, the reproduced image will have the typescript and graphics each occupying their proper position.

Further the two signals ca be super-imposed, if desired, as will be described later.

The resultant composite signal, moreover, can be transmitted over the communication channel 4A and reproduced upon the facsimile receiver 3A at a distant point, since it is in effect, a two-level signal indistinguishable from a normal facsimile signal.

In view of the fact that some operations inside the computer take longer than others and also because the output signals are required form the computer at irregular intervals, it is inconvenient to synchronise closely, the computer program with the rotation of the facsimile receiver drum, and for this reason, a buffer, in this embodiment incororated in the converter 2A, is provided between the computer 1A and receiver 3A.

Figure 2A:
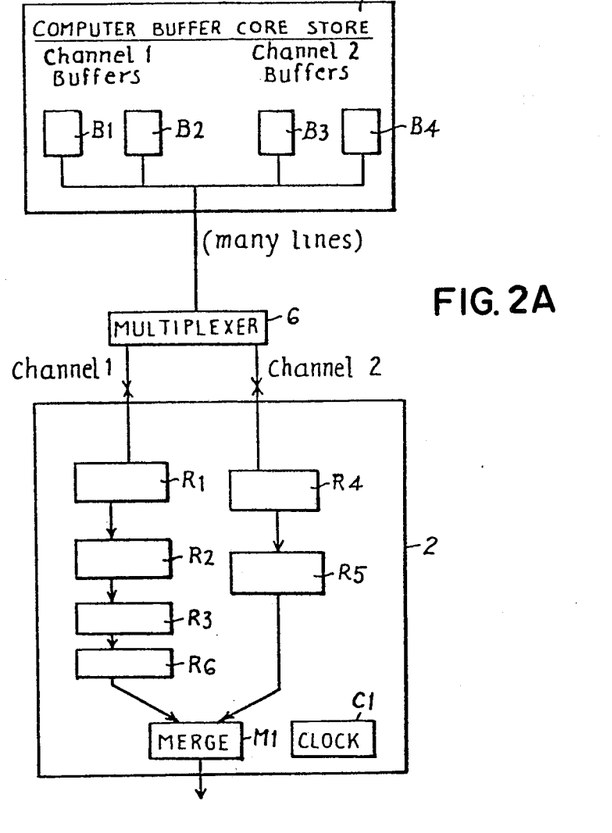
FIG. 2A is a block diagram of one embodiment of the output buffers of the computer and of the stages of the converter.

Referring now to FIG. 2A, the computer buffer store is shown at 1A and operates in conjunction with the converter 2A to smooth out the time divergencies between the computer operations and the fixed time of scanning one line in the reproduced image. The computer buffer may be operated in a number of ways, the most efficient of which is a cyclic system as mentioned earlier. However, in this embodiment a simpler system is described, using four separate storage areas, B1, B2, B3 and B4. The areas B1 and B2 are each sufficiently large to hold the run-length-coding counts for one complete scan across the page. The two areas of the buffer are used such that while the converter 2A is extracting counts form one area and so creating one line scan, the computer 1 is filling the other area by entering into it sufficient counts to cover the next line scan. At the completion of the recording of each scan, a signal, originated by the drum of the receiver 3, is sent via the converter 2 to the computer 1. This causes the computer to start filling the area, B1 or B2, of the buffer just emptied, while the converter is extracting the information from the othr area B2 or B1 of the buffer. The buffer areas B3 and B4 are operated in a similar manner to the buffer areas B1 and B2, i.e. during a period when B3 can be emptied B4 is being filled and vice versa. The function of the buffer areas B3 and B4 will be further described later on.

Figure 3A:
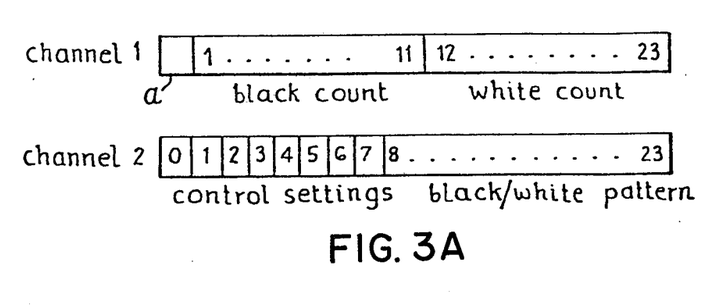
FIG. 3A is an example of the word format in channel 1 and channel 2.

There are two channels from the main computer to the converter via a multiplexer 6A, as shown in FIG. 2A. Channel 1 conveys run-length counts. The buffers B1 and B2 from which channel 1 takes its information contain a series of 24-bit computer words, each of which contains two numbers. That is to say that one word of 24 bits is divided into two parts, the first half being a black count and the second half a white count. This is shown in FIG. 3A. In actual fact there is a third portion, in that the first of the bits in the word (marked $a$ in the channel 1 diagram) is borrowed for a purpose which will be described later.

All the words that the computer stores in these buffers are of this format — the first bit has a special purpose, the next 11 bits are a binary number stating how much black is required, while the remaining 12 bits are another binary number stating how much white is required.

These can be any number up to 2047 (11 binary digits) for the black count and 4095 (12 binary digits) for the white count. The function of the converter, therefore, is to take words successively out of these buffers and to interpret first the black half and then the white half, then to take the next word and interpret it in like manner, sending out appropriate lengths of black and white signal to the facsimile receiver 3. It will be obvious that the length of time to which one of the words corresponds, depends upon the magnitude of the numbers. Consequently it has been arranged that another word is not extracted from the computer buffer B1 or B2 until a previous word has been completely interpreted by the converter, which may, of course, be either a relatively long or a relatively short time.

In considering the operation of the converter, it is convenient to take the worst situation, where several words in succession all contain small numbers and for this reason the converter itself is equipped with three buffers or registers R1, R2 and R3 forming a "push-down" store, each of one word-length, viz. 24 bits. The converter logic ensures that it keeps these registers as full as possible. When it is intially loaded, a word comes into the first register R1, is immediately pushed-down into the second register R2 and the demand is sent back to the computer for another word. Meanwhile the word stored in the second register R2 is pushed-down into the third register R3 and the word in the first register R1, when complete, is pushed-down into the second register R2. Thereafter a demand for a further word is sent back to the computer and so on.

The content of each word is de-coded and counted in a fourth register R6 which comprises two counters — a black counter and a white counter — and as the number is counted down, so the signal transmitted to the receiver via the merge unit M1 is maintained black, until the number reaches zero, when the signal is switched to white and the count-down of the other half of the word begins.

It is necessary that some additional logic should be provided in the converter to deal with the situation where one of these counts is zero. Under these circumstances there will be obviously be a count-down omitted and steps must be taken to provide time to get over to the next word.

Clearly, also, the converter must provide accurate starting points for each scan, so as to synchronise the signals with the rotation of the facsimile receiver drum. This is effected by deriving a trigger signal from the rotation of the drum as mentioned previously.

The converter 2A must also specify to the computer 1A the address in the store from which it requires the next word. To this end, the nature of the complete computer interface is such that it includes a multiplexer 6A having a large number of parallel lines, of which 24 are for information, another 16 are address lines and so on, and the converter must possess the requisite logic to apply the correct signal to all these lines, so as to actually extract the required information from the computer buffers.

Referring now to channel 2, in this embodiment channel 2 is provided with only two registers, R4 and R5, which are loaded from the other pair of buffer stores B3, B4 in the computer. The output from channel 2, like channel 1 is also a 24-bit word, but in the case of channel 2 it has a different format — see FIG. 3A.

The significance of the first bit $a$ in channel 1 words can now be explained. Its function is to instruct the converter 2A as to whether it is, or is not to demand words through channel 2. The convention is that if bit

*a* is a 1 this signifies that channel 2 is to be "on". If, on the other hand, bit *a* is a 0, then channel 2 shall be "off". If therefore, the computer sets a complete scan, and all the first digits of the channel 1 words are 0, channel 2 remains inoperative throughout the whole scan. If, however, at any point across the page, the computer program puts 1 in the *a* position of a channel 1 word, channel 2 immediately becomes operative. The precise function of channel 2 is explained as follows:

First, there is a clock C1 in the converter 2A which advances the channel 2 buffer address steadily, all the way along the scan on the basis of one buffer word per 32 horizontal units along the scan. As there are 36,000 horizontal units per scan, this corresponds to something over 1,000 buffer words, the first word corresponding to the first 50th of an inch from the left hand side of the page, the next word corresponding to the next 50th of an inch and so on. The thousand-plus word corresponds to the last 50th of an inch on the extreme right-hand side of the page. In metric measurement 1/50th of an inch corresponds approximately to 0.5 millimeter.

In consequence, unlike the buffers associated with channel 1, the buffers of channel 2 can be regarded as a pictorial representation of the scan and, whereas channel 1 may define the whole of a scan in a very few words or alternatively in very many words, dependent upon the subject matter of the page, there is no proportionality between the number of words issued by channel 1 and the width of the page.

In the case of channel 2, on the other hand, the number of words is fixed and there is a precise 1/1 correspondence between each word from either one of the buffers and a specific position on any scan line.

As a result, the converter 2A is regularly addressing successive words in channel 2, as the traverse of the scan progresses. In consequence, if, at any moment, a request comes through the agency of bit a in a channel 1 word, that channel 2 should be switched on, the converter in obeying that instruction, immediately collects that portion of the information in the channel 2 buffer that refers to that point in the scan which has been reached at that particular moment.

As regards the format of the channel 2 words a division different from that of the channel 1 word is adopted, in that the last 16 bits of the channel 2 word gives an explicit black/white pattern (see FIG. 3A) on the basis of one bit to each two units of scan. That is to say the units in channel 2 are twice as wide as those in channel 1. This implies that, if any particular one of the 16 last bits in the channel 2 word is a 1, the facsimile receiver will print out two units of black. If conversely, it is a 0, the facsimile receiver will print out two units of white, the sequence being continued until the end of the word is reached. The 16 bits contained in the last half of a channel 2 word occupy exactly a width of 0.02 inch across the page. The next word will fill up the next 0.02 inch and so on, as long as channel 2 is switched on.

Figure 4A:
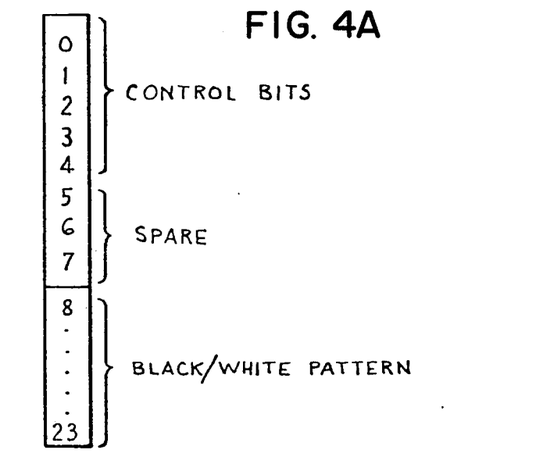
FIG. 4A is a diagram of the control word format of channel 2.

It will be apparent, therefore, that if channel 2 is operative, it will demand a succession of words at fixed intervals of time which would represent a very heavy load on the computer. It is for this reason that the facility for switch channel 2 on and off by the first bit of each channel 1 word has been adopted, in order to reduce the load on the computer. The first 8 bits of a channel 2 word each have certain special functions, some of which have been tabulated in FIG. 4, as follows:

Bit 0 is a general "on-off" instruction, which dictates whether the channel 2 system shall act in accordance with the bits that follow or not. Bit 1 instructs whether the output of channel 1 shall henceforth be inverted or not. Bit 2 performs a similar function for channel 2, i.e. when bit 2 indicates "on" it henceforth inverts the pattern generated by the 16 bits contained in the latter part of each channel 2 word. Bit 3 instructs whether, in merging the output of channels 1 & 2, black or white is to win. In other words if black is to win, and either channel commands black, the final output will be black. If the instruction is that white is to win, the converse applies and the final output is white. This facility permits of a number of combinations between channel 1 and channel 2 which together with the function of bit 4 will be described later. Bits 5 to 8 can be allocated to special functions as required.

As has been described, bit 0 in the channel 2 word is an "on and off" bit, but applies only to the group of control bits and not to the 16 bit black and white pattern which succeeds than in the channel 2 word. The purpose of this is that in a sequence of channel 2 words covering some particular area of the page, an occasional word will be marked in position 0 as being a word containing new settings of the other control parameters. In fact, as far as bit 0 is concerned, 0 = "on" and 1 = "off" so that all those words that have 1 in the bit 0 position are words in which the converter ignores the parameters allocated to bits 1, 2 and 3 (e.g. "invert", "white wins" and so on). When, however, the bit 0 position is 0, this means "take these new values for the parameters and operate on the basis, from now until furher instructions".

As distinct from the function of the first 8 bits in every channel 2 word, the final 16 bit black and white pattern is always printed out whenever channel 2 is switched on by bit *a* in the channel 1 word. The precise nature of the final image is, of course, modified by the change of parameters set in bits 1-3 of the same word if, and only if, bit 0 is an 0. This procedure avoids the necessity for the computer to have to write these control parameters into every word in the channel 2 buffer — it merely has to change them as and when necessary. Bit 4 gives an instruction either to output or suppress the 16 black/white bits which follow at the latter end of the channel 2 word, so that even if channel 2 is "on", this instruction can inhibit the printing of the black/-white pattern.

From the foregoing it follows that if all words in the channel 2 buffer are considered as representing segments of the scan across the page, it is possible to write into a partiuclar word in channel 2 the specific mode in which channel 2 is to operate. This will apply up to some later point in the scan, when some other control word can be written in which could, for example, switch everything back to normal.

Although the primary function of channel 2 is to build up dot patterns forming the half-tone dots of a screened graphic, many novel effects may be produced by discreet use of the control bits in the first part of the channel 2 word. For example, apart from the simple case of inverting black and white, there may also be produced black letters on a dotted background, dotted letters on a background, white letters on a dotted background, captions superimposed on pictures and even large characters in-filled with picture detail. These are only a few of the various effects which are possible. The system lends itself also to the introduction of "mechanical tints" and the reduction of the density of black characters to any shade of grey. All the foregoing effects can be produced without any variation in the operation of channel 1.

Figure 5A:
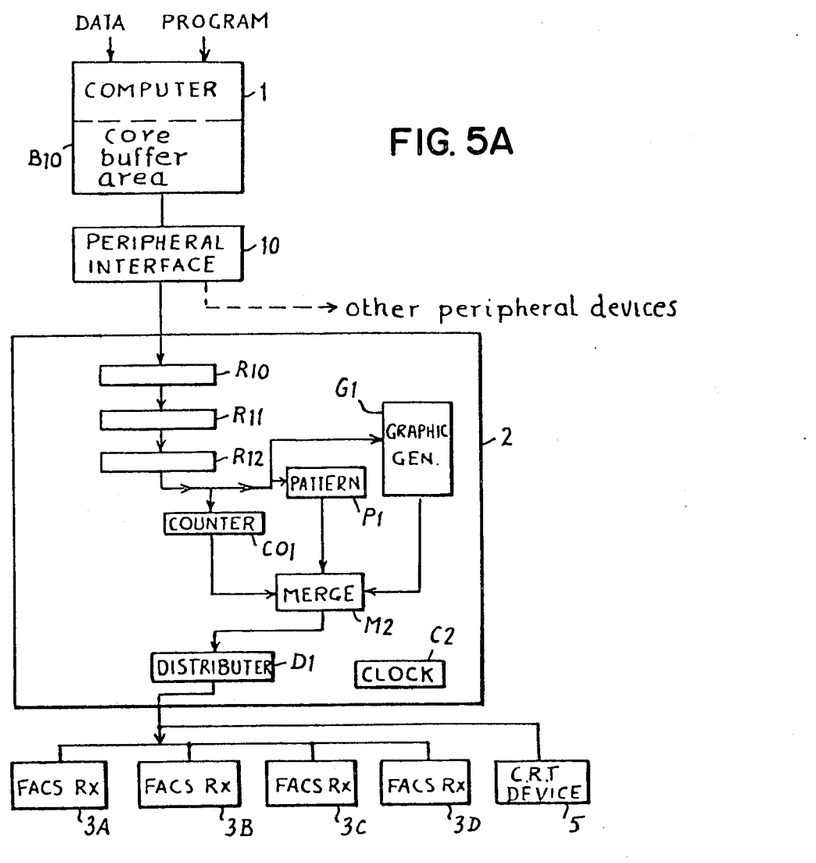
FIG. 5A is a block diagram of a further embodiment.

A further embodiment of the system according to the invention is shown in FIG. 5A. The system again basically comprises a computer 1A, a converter 2A one or more facsimile receivers 3A, and a cathode rav facsimile device 5A. The computer is provided with a core buffer area B10 operated in a cyclic mode. The data to the computer may be obtained as in the previous embodiment. The computer output is fed via the peripheral interface 10 to the converter 2 whose output is in turn fed to the one or more facsimile receivers.

The converter comprises three storage areas or registers R10, R11 and R12, a pattern generator P1, a graphics generator G1, a counter CO1, a merging unit M2 and a distributor D1. In a monochrome system the distributor D1 is not necessary and only a single facsimile receiver is required. However, in a full color system the distributor feeds four receivers 3A, 3B, 3C and 3D, respectively producing films simultaneously to give black, magenta, yellow and cyan separation images employed for producing the different printing plates to give full color reproduction. It will be understood that the links shown between the main units of the system comprise, where necessary, many lines carrying control signals and data in one or both directions.

The output signals from the system may also be employed to drive the cathode ray facsimile device 5A, e.g. for proof reading purposes. Moreover, hard copy full page proofs and proofs containing advertising and editorial graphic material may be produced by the facsimile receivers if they are loaded with light sensitive paper rather than film. If desired, facsimile receivers for producing proofs can operate at a lower resolution than is required for final copy.

As in the previous embodiment, the computer produces a series of 24-bit words which are assembled in the buffer area of the core ready for transmission to the converter and this transfer to the converter is done without requiring any program intervention. Only one channel is used, as the data transmitted for the generation for patterns and graphic material is interleaved with the main text information and not transmitted down a separate channel as in the previous embodiment. Such an arrangement simplifies the converter and general control system.

Figure 6A:
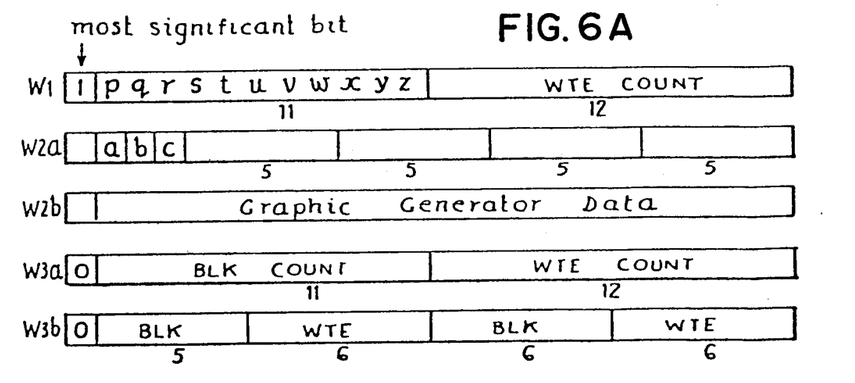
FIG. 6A is a diagram of the word format for the embodiment of FIG. 5A.

The main data stream from the core buffer area B10 to the converter 2 consists of 24-bit computer words having any of the formats shown in FIG. 6A. A word with format W1 is termed a control word and contains control instructions affecting the devices in the converter. In certain instances the word immediately following a control word may be a secondary control word with either format W2a or W2b. The secondary control word provides data required by the pattern generator P1 or the graphic generator G1.

Words of format W3a form the bulk of the data stream, and each contains a black and a white run count as in the previous embodiment. An alternative format W3b is provided in which four counts of smaller values can be accommodated. These data words are distinguished from control words by the value of the most significant bit, which is always 1 in a control word W1 and always 0 in a data word W3a and W3b.

All words are received by the converter over a 24-bit parallel highway and are gated first into the 24-bit register R10 and from thence into registers R11 and R12. The three registers from a push-down store operating in a similar manner to that described in the previous embodiment.

A control word is identified by the fact that the most significant bit is a 1, and the portion of this word that contains control instructions is used not as a black run count but to initiate control actions on completion of the white count for the preceding word. If a secondary control word is indicated as following a control word, this word is routed to the pattern generator or grahic generator as appropriate.

The instruction portion of a control word W1 occupies the 11 bit positions normally used to hold a black count, and the bits have meanings as follows:

$p$: if $p = 1$, invert the output of counter CO1 henceforth.

$g,r$: selects one of four facsimile receivers to receive the output of counter CO1 via the distributor D1, the other receivers receiving a modified version of this image according to the instructions that are supplied for merging.

$s,t$: selects one of four methods of merging the outputs of the counter CO1 and the pattern generator P1 so as to form suitable images for the four facsimile receivers.

$u,v$: selects on of four methods of merging the outputs of the counter CO1 and the graphic generator G1.

$w$: indicates that the following word is a secondary control word and arranges for it to be routed to the pattern generator P1.

$x$: indicates if $u = 1$ that the following word is a secondary control word and arranges for it to be rounted to the graphic generator G1, or if $u = 0$ that the graphic generator is to cease operation.

$y$: not allocated.

$z$: indicates whether the data words which follow are in format W3a or W3b and adjusts the mode of operation of the counter CO1 accordingly.

The remaining 12 bits of a control word contain a white count of the normal kind, which follows the control action.

A secondary control word of format W2a contains four 5-bit run counts which may define a pattern that is to be generated. In this case bit $a$ specifies whether the pattern is to be inverted, and bits $b,c$ select one of the four output channels via the distributor D1. The word can alternatively define a color tone (if the most significant bit of the word is a 1), and in this case supplies four values of color intensity to the pattern generators.

A secondary control word of format W2b defines the required mode of operation of the graphic generator G1. When the latter takes the form of an electronic scanner it is arranged that more than one secondary control word can be accepted in order to specify in full the scan that is to be carried out.

The converter 2 also includes a master clock C2 of 7.776 MHz. The signal from this clock, or a derivative of the signal, is synchronised with the facsimile receivers using 40Hz phase pulses produced by their rotating drums, and is used to control the timing of all the actions of the converter.

In this embodiment there are 23.3 usable inches around the circumference of the facsimile drum and there are 1600 elements to the inch. Hence the total count of elements along one line scan across the film can reach 37280. However, at any point along the scan the generating of the video signal is discontinued if an all-zero word is encountered in the data stream, and the necessary resetting actions are initiated by the converter as to be ready to start the next scan at the appropriate instant. When using certain types of receiving facsimile device, such as a cathode ray tube, this enables a series of comparatively short line scans to be implemented, and each succeeding scan can start as soon as the computer sends a signal to indicate that it has prepared the necessary data in the core buffer area B10.

By means of the various control actions described in this embodiment the system may produce not only black text on a white background or white text on a black background but a number of combinations of a text image with repetitive patterned imges or with picture elements. In addition, the data prepared by the computer can cause any of these various effects to appear in selected portions of the image area so as to construct a page containing a wide range of visual images. Further, the images required to produce a page in full color can also be generated.

It will be understood that the facsimile receivers and cathode ray facsimile devies may be remote from the main computer and converter and be connected thereto by any suitable form of signal channel, which may include either a cable or radio link. Moreover, the system can use a variety of sources for the graphic data including a facsimile transmitter, as previously described. Text from remote locations can also be transmitted in this way if desired.

The size of page that can be produced is governed only by the dimensions of the facsimile receiver drum, provided of course that its speed of rotation is chosen so as to allow the computer sufficient time to assemble the data for successive scans.

Where the system is operated so as only to reproduce an image on a cathode ray device, it can operate at a higher speed than when reproducing an image on a facsimile receiver, since the latter involves a mechanical scanning arrangement.

Since the systems described produce an output consisting of successive scans across an image, this output could, for example, be recorded on a storage device and then by "played back" at T.V. speed to produce a video picture of the image in question. Essentially the same computer programs and converter equipment would then compose type and other images for video transmission or closed circuit T.V. displays.

According to a modification, the converter 2A con be located adjacent the facsimile receiver or receivers 3A and a signal channel can extend between the output from the computer 1A and the input to the converter 2A.

The facsimile receiver or receivers may include a hesitation or pause facility, which operates if a blockage or break occurs in the information fed to a receiver. When the fault is cleared the receiver can continue to receive information at the point where it left off.

It will be noted that in the system according to the present invention, for the purpose of increasing the resolution in the scanning line direction, the number of elements per inch along the line is made to be appreciably greater than the number of scan lines per inch. In this way images of adequate quality can be obtained with a moderate number of scan lines per inch. Thus, in the specific embodiment described, the scan line density is 400 lines per inch and the horizontal definition is 1600 elements per inch.

Where the signals are transmitted in the form of run-length coding, this improved result can be obtained without appreciable increase in the amount of data to be generated and reproduced. since no additional transitions from black to white and vice versa are introduced, and the rise and fall times necessary to provide the requisite sharpness of image remain unchanged.

More specifically, although the number of trains of black pulses is unaffected, their durations and their points of incidence and termination along a scan are capable of being more accurately controlled to a degree depending upon the chosen increase in the horizontal definition with respect to the number of scan lines each per unit distance.

This arrangement particularly provides a greatly improved reproduction of those sloping and curved portions of typescript characters which are inclined with respect to the scan line direction.

From one aspect the invention provides apparatus for scanning graphic material in order to produce an electrical output signal which may be employed to reproduce the graphic information, comprising a scanning light spot for scanning the graphic material, a photosensitive device for producing an electric output signal modulated according to the graphic information, and control means for positioning the scanning light spot at the start of each scan according to predetermined coordinates, whereby any scan can be commenced at any desired point on any item of graphic material within the field of scan of the light spot.

According to a feature of the invention, the light spot is controlled so that it may move intermittently, for example stepwise along contiguous parallel scans, across the graphic material. The light spot is preferably produced by a flying spot scanner eploying a cathode ray tube or other device such as a laser with suitable deflection means.

Advantageously the graphic material is in the form of one or more transparencies which are caused to be scanned by means of the light spot and the light passed by the or each transparency is received by the photosensitive device producing an electrical output signal modulated according to the graphic information, i.e. the varying density of the transparency. Alternatively the graphic material may be in opaque form and scanned by a reflection copy flying spot scanner which produces the electrical output signal modulated according to the graphic information. In this case the path of the flying light spot may be modified along each scan in order to accommodate pre-screened material.

The electrical output signal is subjected to correction processes to compensate for errors in the system and is converted into a digital signal representing regions of black (or another colour) and white and may then be fed to a photo composing devie or other facsimile device which produces a reproduction of the graphic material.

The output signal may, where necessary, be subjected to an electronic screening process in order to produce a signal capable of reproducing the graphic material in a form similar to the half-tone reproduction of photographs. This can be achieved by converting a scanned element of the graphic material into a particular pattern of dots selected according to the optical density of the element. This enables a photograph or other picture having gradations of tone to be converted into an arrangement of dots of varying sizes and separations which can be printed on paper or other material, each individual dot being of uniform tonal density, but which cumulatively produce the visual effect of the gradations of tone of the original graphic material. If desired, different sets of dot patterns may be used in the electronic screen generator in order to vary the effective screen ruling, to optimise the screen with respect to particular printing processes, and to gain certain special effects.

According to another feature of the invention, the scanning of the light spot is controlled by means of control signals derived from a computer or analogous automatic control means so as to co-relate the scans of the graphic material with the generation of other material, e.g. text, so that the graphic material may be reproduced in a desired position in relation to the text on the photosensitive surface from which a printing plate is produced for the reproduction of a printed page. The control signals may include signals representative of values along two orthogonal co-ordinates in order to determine the correct position of the scanning light spot at any one time, as well as signals relating to other parameters used in the control of the scanning and reproduction of the graphic material.

Where it is desired to reproduce graphic material in colour, a plurality of photo-sensitive devices are used each sensitive to a different colour and each producing its own output signal. Each output signal is fed to control a separate photo-composing device for producing a photographic image representative of one of the colour separations.

From yet another aspect the invention provides apparatus for scanning graphic material in the form of one or more colour transparencies that are to be reproduced, comprising a light spot controlled according to predetermined coordinates so that it scans along contiguous lines across the graphic material, a plurality of means, each responsive to a particular colour only, for detecting the optical density, each with respect to its particular colour ingredient, of the element of graphic material illuminated by the light spot along a series of contiguous regions comprising the scan line and for producing an electrical signal having variations corresponding to the said optical density, and means for converting each electrical signal into a particular sequence of electrical signals selected according to predetermined control information suitable for input to a photo-composing device, thereby to cause the latter to produce an image on a photo-sensitive surface. Preferably the apparatus also includes means for connecting said apparatus to external control means such as an interface to a computer, which may be used to control both the scanning of the light spot and the method of selecting the appropriate sequence of signals for each colour ingredient in each scanned element of the graphic material.

According to a further feature of the invention means are provided to enable the graphic material to be reproduced either on an enlarged or reduced scale with respect to the original.

A further feature of the invention allows deliberate anamorphic distortion within limits, by reproducing the graphic material with one axis at a diffeent magnification, or reduction, compared with the orthogonal axis.

According to yet a further feature of the invention means are provided to enable only a portion of any one item of the graphic material to be reproduced.

According to another feature of the invention means are provided for modification or correction of the colour or tone of the graphic material reproduced.

The invention will now be further described, by way of example, with reference to the accompanying drawings, in which:

FIG. 1 is a block diagram of one embodiment of scanning apparatus according to the invention, FIG. 2 is a diagram showing how graphic material consisting of four transparencies might be held in a holder and scanned;

FIG. 3 is a diagram illustrating how the graphic material shown in FIG. 2 might be reproduced in combination with other material;

FIG. 4 is a block diagram of the controller used in the apparatus of FIG. 1, and FIG. 5 is a block diagram of the video processor used in the apparatus of FIG. 1.

The apparatus to be described comprises a device for optically scanning graphic material in the form of one or more transparencies and for reproducing the information obtained from the scanning in the form of electrical signals suitable for input to, for example, one or more photo composing devices. The apparatus may be used in conjunction with a composition system as described in the aforementioned co-pending application No. 31645/69. The embodiment to be described is intended for the reproduction of graphic material in colour.

Referring to FIG. 1, a cathode ray tube 1 generates on its face a 'flying spot' of light and, to this end, is provided with appropriate power supplies 2, deflection coils 18, static and dynamic focus coils 16, dynamic astigmatism correction coils 17 and anode aperture alignment coils 15. The tube is arranged to receive control information from a controller 3(which is described in detail with reference to FIG. 4) which is linked to an interface connected to a computer from where control information is derived. This control information includes information to control movement of the light spot along cartesian co-ordinates X and Y, and also to control the brightness and size of the light spot. For the reproduction of graphic material in colour, the cathode ray tube has a suitable wide band phosphor. The light spot is focussed by an objective lens 4 onto a plane in which is located a holder 5 for holding one or more transparencies which constitute the graphic material to be reproduced. The light that passes through the transparency or transparencies is directed by means of condenser lenses 6 and dichroic beam splitters 20 onto the apertures of three photomultipliers 7 with suitably matched spectral response, provided with power supplies 8. The power supplies 8 are individually set so that each photomultiplier operates on its plateau of maximum efficiency. Additional optical components 13 and photomultipliers 14 may be used to provide the facility for unsharp masking in order to modify the density range of the original and to improve the quality of the final printed result. To assist in controlling the light spot there is provided a deflection monitor system 11 including a beam-splitter 19, condenser lens 21 and photomultiplier 10 for monitoring and for feeding back to the controller 3 information on the position and intensity of the light spot. Information regarding this intensity is also fed to the power supplies 2 so that the tube beam current may be automatically stabilised. The positional information may be determined, for example, by imaging the spot on a series of optical gratings 12. Signal processing circuitry following the photomultiplier 10, may then, by pulse counting techniques, determine the spot position as well as providing a reference signal describing the brightness of the spot. The signals from all the photomultiplier tubes 7, 10 and 14 are fed to a video processing unit 9 which is illustrated in FIG. 5 and will be described later. This processor 9, produces four output signals to control the magenta, yellow, cyan, and black printers for full colour reproduction in a manner well known in the printing art.

Protection circuits (not shown) are provided throughout the system to prevent damage occurring from accidental exposure of the photosensitive surfaces to strong light and the failure of critical power supplies.

The information received by the controller 3 from the computer includes digital signals that give the starting position for a particular scan in terms of X and Y co-ordinates. A scan normally consists of movement along either the X direction or the Y direction. This movement may conveniently consist of a series of steps. The information received by the controller 3 from the computer may also include the size of the steps, which would be related in a fixed manner to the size of each element to be scanned, and to the spot size. The length of the scan may also be specified, for example, the total number of steps to be made. From this information the controller 3 generates analogue signals to drive the deflection coils 18. As soon as this process has commenced, feed-back information from the deflection monitor system 11 may be used to modify the signals generated by the controller 3 so that the light spot is moved to its desired position with an improved combination of speed and accuracy.

The information received by the controller 3 from the computer also includes the desired spot brightness. This information may, for example, cause the light spot to be turned off completely, to dim it during its initial positioning, or to control its peak intensity in such a way as to compensate for particular properties of the objective lens. This compensation is supplementary to the function carried out by the intensity feedback control system described above.

The operation of the apparatus is synchronised with the operation of the computer control system described in the aforementioned co-pending application, by means of a clock signal derived from the master clock generator described in that application. A pulse generator within the controller 3 is started and stopped by means of strobing signals which are generated in the associated apparatus when the computer therein transmits a control word. When the generator is running it is maintained in synchronism with the aforementioned clock signal. It will be appreciated that the control words described in the aforementioned co-pending application are not transmitted to the controller 3. The operation of the controller 3 is subject only to the information received from the computer in the form of parameter words.

The dichroic mirrors 20 split the light transmitted by the condensers 6 into three components corresponding to different colour bands of the visible spectrum. Each component is then incident on a photomultiplier tube 7. Advantageously, the particular colours used are the three so-called primary colours, or colours close thereto.

Referring now to FIG. 5, the video processing unit 9 will be described in detail. The signals representing the three colour components of the object transparency are respectively fed to integrating circuits 41, where the current from each photomultiplier tube is accumulated by a capacitor during the bright-up time of the cathode ray tube spot. At the end of the bright-up period, the charge on each capacitor is sampled by sampling circuits 42, and the capacitors are then discharged. The signals from the unsharp masking optics 13 and photomultipliers 14 are integrated and sampled and merged with the main colour signals in units 43. These units each contain a logarithmic amplifier after the merge logic. Three unsharp masking channels have been shown but, if desired, only one channel may be used and the masking signal applied to one main colour channel, for example the yellow printer, and via the colour correction comparator 48, to the black printer as well.

The signal from the spot intensity monitor 41 is processed by a control logic 49. Information regarding desired spot size, which affects brightness, and required tone ranges is used by logic 49 to provide correction signals to drive the comparator 48 and level correction logic circuits 44. The output from these units are signals whose amplitude is proportional to the optical density of the film, which are independent of phosphor brightness variations and the variations in light transparency characteristics of the lens 4 and are constrained within amplitude ranges suited to the reproduction process. The pulse counting circuits 50 and correction logic 51 may be used to provide spot position correction information for use by the controller 3 (described in detail with reference to FIG. 4) in computing the X and Y deflection signals.

The colour correction computer 48 is not described in detail. It may be constructed according to principles well known in the printing art, as for example described by Yule in the book 'Principles of Colour Reproduction'. Information describing the ink, printing press and paper characteristics may be entered manually prior to scanning the graphic material. Other information from the main computer describing adjustments to the tone values to be reproduced may be sent during the actual scanning operation. The colour correction computer 48 uses this information to provide signals to control the gain of variable amplifiers 45 and to generate the black printer signal, if full colour reproduction is required.

Analogue-to-digital converters 46 convert the four colour signals into, for example, 5-bit characters at a rate of 121 kc/s along each channel.

The electronic screening unit 47 processes this information under control of the computer to provide signals suitable for producing 3 or 4 color separations on the photo composing devices mentioned previously. The separations may then be re-combined to produce a reproduction in color of the original graphic material in a manner well known in the printing art.

FIG. 2 shows how graphic material comprising, for example, four transparencies T1, T2, T3 and T4 might be laid out in the holder 5 which may be of any desired form. The image of the deflection field of the light spot on the face of the cathode ray tube 1 is sufficiently large to encompass all the graphic material in the holder 5. During a typical scan, a control instruction may be received which calls for the light spot to be moved, for example, to point P of transparency T1. The controller 3 decodes the instruction to determine X and Y coordinates and causes the spot to move to point P. A further instruction may then be received to commence a stepping scan towards the point Q, moving, for example, in small steps of a specified size. On receipt of an instruction to stop, the spot may be returned to a central or reference position, and the scanner is then available to respond to further instructions, such as to reposition the spot at point R in transparency T2, an (later) to proceed in steps of a possibly different size towards the point S until again instructed to stop.

The output of the apparatus may be merged with signals from other apparatus such as, for example, that described in the aforementioned co-pending application and the combined signals used to operate a photocomposing device. This device may be, for example, a facsimile receiver which employs a rotating drum on which a photographic film or photosensitive paper is positioned and the recording is done by means of a light source modulated by a signal to be recorded and traversing the drum thereby producing the lines of scan.

Referring now to FIG. 3, there is shown a sheet of photographic film F on which an image of text and graphic material is to be recorded, so that a printing plate can be subsequently produced from the film for the printing of a page. The film has been shown flat for the sake of clarity. The direction of traverse of the light source is down the height of the page, so that the rotation of the drum gives a series of output scans across the page as shown.

The four pictures P1, P2, P3 and P4 are shown as they might conceivably be required to appear in a printed page of, for example, a newspaper. Transparencies from which these pictures are to be reproduced may be positioned in any convenient layout in the holder 5, for example, as in FIG. 2, and it is to be understood that transparency T1 corresponds to picture P1, T2 to P2, etc. In this example, when scan Sx is reached in reproducing the page image, part of the information to be recorded on this film is required to be obtained from the apparatus scanning the graphic material, and by supplying control instructions to that apparatus the computer controlling the production of the page image can ensure that a scan across the appropriate transparency is executed at the appropriate time. In this example the first such scan will be across transparency T1 so as to reproduce a portion of picture P1. The timing and contents of the instructions are such as to cause the apparatus to scan from the point P to the point Q during the period of time when the facsimile device is scanning from the point A to the point B of the film. Similarly on a later scan Sy, instructions are sent to the scanning apparatus to scan first across transparency T1 and then later across transparency T2 in order to reproduce portions C-D and E-G of pictures P1 and P2 which lie along scan Sy of the facsimile receiving device. FIG. 3 also shows a later scan Sz in which the scanning apparatus requires to be activated three times in order to reproduce portions H-J, K-L, M-N of pictures P3, P4 and P2.

It will be noticed that a small gap is left between pictures P3 and P4 as reproduced on the film F, in order that the light spot in the scanning apparatus shall have time to move from one transparency to another, since the respective transparencies may be disposed anywhere in the scanning field of the light spot: that is to say, this operation is essentially a random access operation. However, it is not strictly necessary to leave such a gap as the speed of the scanner is such that the information lost, should the graphic items be immediately adjacent, would not be noticeable in the printed reproduction.

The information sent by the computer to the controller 3 includes instructions concerning the processing of the electrical signal as well as position control information already indicated. These instructions may be presented in different ways according to the actual apparatus used and its particular application. In this embodiment, a presentation in the form of 24-bit words is described such as might be used in the system described in the aforementioned co-pending application.

The 24-bit words may be conveniently divided into control words and parameter words. The control words include information to identify the particular graphic scanning device involved (where there is more than one), to specify how the signals from the apparatus are to be merged with other signals conveying, for example, typographic images, and to generate the strobing signal which causes the controller 3 to accept the parameter word information which will be present on the 24-bit data highway at this time. It should be understood that the control words are interpreted by the logic of the system described in co-pending application No. 31645/69 and it is only the parameter words which are transmitted to the controller 3. The first parameter word, which is transmitted by the computer immediately following the first control word, specifies the X and Y co-ordinates of the starting position. The strobe signal that causes this information to be accepted also serves to start the spot moving. Referring to FIG. 3, the events just described occur in advance of the scan Sx reaching point A, for example, so that the light spot can take up the position P on the transparency T1 in FIG. 2. Still before point A is reached, a second control word causes a second strobe signal to be sent to the controller 3 to cause a second parameter word to be accepted. This word conveys information specifying the magnification, the direction of scan, whether reproduction is positive or negative, and may include details concerning tone correction. A single bit in this word determines whether it is color or monochrome, and if the latter, further information is given to specify line or half-tone and which single color channel is required. When point A is reached a third control word is transmitted and the resulting third strobe pulse received by the controller causes the video processing electronics to begin the charge sampling operation described above. Third and fourth parameter words may be sent with further details of tone correction and choice of electronic screen, for example.

The scanning apparatus now commences to read out the graphic data between points P and Q in a continuous stream along the scan direction.

A parameter word after each control word is not always necessary. For example, when point B in FIG. 3 is reached, a control word may be transmitted which merely causes the operation of the scanning apparatus to stop. At point D during scan Sy, on the other hand, after the control word stopping the apparatus, a parameter word is sent specifying the starting co-ordinates (point R) on the next transparency T2 to be scanned.

The controller 3 is shown in detail in FIG. 4 and receives 24-bit parameter words from the computer interface over a 24-line data highway. The strobe signal, derived from the decoding of a control word by the associated apparatus, causes the sequence control unit 25 to copy the information into a 24-bit buffer register 22 via OR gates 32. A counter in unit 25 keeps a check on the number of parameter words received so that the next parameter word, for example, can be identified as the second or third in the sequence and therefore can be routed to other 24-bit buffer registers 23 or 24. When a word has been loaded into an appropriate buffer, parallel logic 27 will immediately perform the necessary decoding and digital signal processing in such a way that this processing will always be complete before the arrival of the next parameter word. If necessary the logic can be extended to include a fourth parameter word buffer register. The decoded signals describing the position co-ordinates, the setting of the tone correction circuitry and any other desired function are routed under the control of the sequence control register 25 which is synchronised as described previously. Circuits 30 and 31 are the X and Y co-ordinate digital-to-analogue converters respectively and the analogue correction logic 29a, 29b, 29c functions automatically. The controller may also include fixed number generators 33 to return the spot to a preset state in the absence of other instructions. These number generators define X and Y co-ordinates which can be loaded into the register 22 through OR gates 32, when required. Similarly if a position feedback signal is provided, this information would be compared with the contents of register 22 and, at an appropriate time, an error signal loaded into register 22. The final strobe signal in a sequence will start the actual scanning operation. This will normally be a step-wise scan along the X axis and the size of the step will be determined from the magnification information held in register 23, which also controls the step direction. The contents of the X part of register 22 will be automatically incremented through the adder 26. This process will continue until the next strobe pulse is received which automatically stops the current scanner operation.

Certain control signals concerning focus, astigmatism and brightness are generated automatically. Astigmatism is an inherent distortion in the deflection system and optics. By monitoring the spot position (X and Y) preset logic can counteract this distortion. The astigmatism control unit 29a performs this function. Deflection defocussing is another unavoidable distortion in flying spot scanners but can be counteracted by preset logic which notes the spot position and applies a correction signal to the focus coil.

The dynamic focus control unit 29b performs this function and its operation is modified according to the spot control unit 28 which derives the correct spot size and step size according to the magnification and scanning mode required.

When scanning line-work, for example, an overlapping scan pattern will normally be used and forms a modification of the contiguous pattern that will often be used for scanning continuous tone material.

The control signals from the correction circuits 29 are fed to amplifiers 34 in order to generate the current required to drive the tube control coils. The spot size signal is used to control the main focus coil and also to adjust the CRT beam current.

In some situations the total length of scan may be specified in terms of the number of steps required. A counter may be provided for this function within the sequence control unit 25, and the signal to stop the X increment logic operating may come from this counter as an alternative to the normal timing control which is synchronised with the arrival of the next control word.

Where in the use of the scanning apparatus a screening process must be performed analogous to that performed by a conventional optical screen in normal half-tone graphic reproduction systems, in order to obtain the desired gradations of tone, this is carried out electronically by building up dots of varying sizes by the suitable juxtaposition of many small elements. A typical screen may be 100 lines per inch i.e. as if the dots are produced by diffraction through a screen with 100 meshes to the inch. The dots on the page will then be of the order of 0.01 inch diameter and these elements are laid down to form screen dots which produces a similar result to that produced by a mechanical half-tone screen.

Each dot on the page is built up by assembling a set of rows of small elements to form a particular pattern, selected according to the density value of the dot. The number of rows per dot depends upon the equivalent screen size. A line of these rows, one row for each required dot, is laid down during a single output scan until that line is completed. It will be appreciated that means must be provided for making available the same set of density values when the second and subsequent rows of elements come to be laid down in order to build up the line of dots. Therefore the input scan may be repeated several times across the same portions of the transparencies until there have been sufficient output scans to complete the line of dots. Alternatively it can be arranged to hold the set of density values for the whole line in a special store until the line of dots is complete.

The screening process is not necessary for the reproduction of line drawings or other material having no gradation of tone.

It may be appreciated that the scanning apparatus can be used to output continuous tone information as an analogue signal, by-passing the electronic screen generator.

Control information can be employed to turn the electronic screening on and off or alter the screen size, for example between 110 size screen and a 65 size screen.

Since the scanning apparatus provides a large measure of control of the scanning process, 'cropping' of desired portions of the graphic material is readily accomplished. Thus, if a portion of a transparency is not required to be reproduced, the computer may calculate the starting and stopping co-ordinates accordingly. Similarly, any 'cut-out' shape from the graphic material can be produced in the output.

Enlargement or reduction is also achieved under computer control. For example, if the input transparency is 2 inches square and it is desired that this picture takes up a 6 inches square space on a printed page, then the scanning operation is controlled so as to generate a 3-times magnification by advancing in steps of an appropriate size. Reduction is similarly possible and the total range of enlargement and reduction that can be obtained is limited only by the accuracy of the scanning apparatus. In a typical case these may range from ⅛ to 5 to 1.

The degree of enlargement or reduction which can be achieved is effected by controlling the spot size and the size of the scanning steps under the control of the controller 3. The deflection sensitivity of the cathode ray tube and the relation between the input and output scan densities are pre-determined. Therefore, on receipt of a number specifying the magnification, the spot size and deflection step can be worked out by the controller 3.

Where a large number of pictures may ultimately be needed on a single page together with the need to enlarge some of them by a large factor, a very high resolution over a large field is required. This requirement may not be met by a single graphic scanning apparatus, in which case two or more such devices may be used, linked together in a suitable manner for control by the computer.

It will thus be understood that by means of the apparatus according to this invention, graphic material comprising a number of transparencies may be reproduced on a sheet of photo-sensitive material and merged with textual matter generated by other means, the reproductions of the transparencies occupying any desired positions on the photosensitive sheet, irrespective of the original positions in the holder 5. Each transparency may individually be cropped, enlarged or reduced in scale, and may have individual tonal correction. Photographs or other material having gradation of tone may be 'screened' without the use of a conventional optical screen.

The operations may readily be controlled by control means, for example a computer, and it will be appreciated that this method of control readily allows changes to be made in any of the operations.

It will also be understood that the graphic material may be reproduced on a display device, such as a cathode ray tube, as described in copending application No. 31645/69, instead of or in addition to its reproduction on a photosensitive surface.

The scanning device, or devices, may be incorporated into a special terminal which forms part of an automatic composing system. The terminal may be equipped with display means to enable the operator to view the graphic material loaded into the scanning apparatus and with control means to facilitate setting up the apparatus, loading it, and conveying to the controlling computer information regarding the current state of the terminal.

In a typical composing situation, the graphic material may be received together with instructions as to how it is to be reproduced and which part, if any, is to be cropped out, in addition to identification data. The operator can then load the scanning apparatus, monitor the loading process via the display, and by means of displayed cursors, monitor the entry of the cropping instructions. When he is satisfied, he would then cause the computer to read this information, including the relative positions and sizes of the individual graphic items. Having used this information in the composing process, as described in the aforementioned copending application, the computer would then cause the scanning apparatus to operate and convey the graphic information to the photocomposers under suitable timing and and merge control.

It will be realised that this detailed information describing the graphic items, which is normally routed directly to the photocomposing device as just described, is accessible to the computer through the interface described in the aforementioned copending application. This permits the system to be used for a wide variety of digital graphic processing operations in addition to its normal function as a means of inserting graphic material into automatically composed pages of text.

We claim:

1. A photo composing scanning system having an apparatus for scanning graphic material to produce an electrical output signal which is employed to reproduce the graphic information, comprising:
    cathode ray tube means for producing a spot of light,
    graphic-material bearing means,
    a plurality of discrete items of graphic material mounted on the bearing means for sequentially illuminating elements of the items by the spot of light,
    random access step-by-step scanning means connected to the cathode ray tube and operating in a random access mode for causing the spot of light to scan sequentially in step-by-step increments individual selected portions of selected items of graphic material on the bearing means,
    random access starting means connected to the scanning means for beginning scanning of the spot at precisely selected predetermined orthogonal coordinates of a starting point for each selected portion,
    scan length control means connected to the first means and operating in a random access mode for controlling lengths of scan lines on which the spot of light is caused to scan the selected items whereby amount of the graphic-material bearing means covered by any scan line is controlled,
    step size control means connected to the scanning means and operating in a random access mode for controlling size of step-by-step increments in which the spot is advanced along the scan line, thereby controlling time intervals covered by one scan in the electrical output signal and controlling resulting magnification scale between scanned items and reproductions of said items,
    spot size control means connected to the cathode ray tube means for controlling spot size, and
    photosensitive detector means connected to the cathode ray tube means responsive to light which has scanned the graphic material for producing said electrical output signal modulated according to the graphic material.

2. Apparatus as claimed in claim 1, including means for subjecting the electrical output signal to an electronic screening process in order to produce a signal capable of reproducing the graphic material in a form similar to the half-tone reproduction of photographs.

3. Apparatus as claimed in claim 1, including means for introducing deliberate anamorphic distortion, within limits, be reproducing the graphic material with one axis at a different magnification, or reduction, compared with the orthogonal axis.

4. Apparatus as claimed in claim 1, including means for reproducing the graphic material on a visual display device such as a cathode ray tube.

5. Apparatus as claimed in claim 1, including a controller which is connected to a computer or analogous automatic control means from which control information is derived for providing the required control signals for the scanning light spot.

6. Apparatus as claimed in claim 5, including a deflection monitor system to assist in controlling the scanning light spot and which feeds information on the position and intensity of the light spot back to the controller.

7. Apparatus for scanning graphic material that is to be reproduced, as claimed in claim 1, further comprising a plurality of means, each responsive to a particular colour only, for detecting a characteristic, each with respect to its particular colour ingredient, of the element of graphic material illuminated by the light spot along a series of contiguous regions comprising a scan line and for producing an electrical signal having variations corresponding to the said characteristic, and means for converting each electrical signal into a particular sequence of electrical signals selected according to predetermined control information for input to a photo-composing device for that colour, thereby to cause said plurality of photo-composing devices to produce images on a photo-sensitive surface.

8. Apparatus as claimed in claim 7, wherein the output signals from each photosensitive device are respectively fed to video amplifier means which feed tone control means from which the output signal is derived.

9. Apparatus as claimed in claim 8, including additional photosensitive means asociated with each photosensitive device in order to provide for the modification of the reproduced image by unsharp masking.

10. Apparatus as claimed in claim 9, wherein each video signal is fed to a logarithmic amplifier and a comparator, said comparator also being fed with the output from each additional photosensitive means, and the output from the comparator is fed to the tone control means.

11. Apparatus as claimed in claim 1, wherein the graphic material comprises at least one transparency which is scanned by the spot of light and wherein light passed by the at least one transparency is received by the photosensitive detector means which produces an electrical output signal modulated according to varying density of the transparency.

12. Apparatus as claimed in claim 1, further comprising corelating control means connected to the scanning means for corelating the scanning of the light spot by means of control signals with scans of text material, whereby the graphic material may be reproduced in a desired position in relation to the text on a photosensitive surface from which a printing plate is produced for the reporduction of a printed page.

13. Apparatus as claimed in claim 12, wherein the corelating means include means for producing signals representative of values along two orthogonal co-ordinates for determining the correct position of the scanning light spot at any one time, as well as means for producing concurrent signals relating to magnification, length of scan portion, spot brightness, required tone range, and tone correction information.

14. Apparatus as claimed in claim 1, further comprising means for enabling only a portion of any one item of the graphic material to be reproduced.

15. Apparatus as claimed in claim 1, further comprising visual display means connected to the detector means for reproducing the graphic material on a visual display device.

16. Apparatus as claimed in claim 1, further comprising a deflection monitor system connected to the scanning means for controlling the scanning light spot and for feeding information concerning the position and intensity of the light spot back to the controller.

17. Apparatus for scanning graphic material that is to be reproduced, a cathode ray tube means for producing a light spot, a mounting means, plural items of graphic material positioned randomly on the mounting means, random access control means connected to the cathode ray tube means for controlling the light spot according to predetermined co-ordinates so that the light spot moves from point to point, each point being independently defined, the control means comprising means for independently controlling the length off each scan, thereby producing scan lines of varying length and means for causing said light spot to scan successively along individual portions of selections of the graphic material, a plurality of means, each responsive to a particular color only, for detecting optical density, each with respect to its particular color ingredient, of only one element at a time of the items of graphic material illuminated by the light spot along a series of contiguous elements comprising any one scan and means for producing an electrical signal having variations corresponding to the said optical density, and means for converting each electrical signal into a particular sequence of electrical signals selected according to predetermined control information for input to a photo-composing device for that color, thereby to cause said plurality of photo-composing devices to produce images on a photo-sensitive surface in an order unique from an order of plurality items on the mounting means.

18. Apparatus for scanning graphic material to produce an electrical output signal which is employed to reproduce the graphic material, comprising cathode ray tube means for producing a light spot, a mounting means, plural items of graphic material arranged in an order on the mounting means, random access scanning means connected to the cathode ray tube means for causing the light spot to scan individually selected portions of the items of graphic material in a series of successive scans, a photosensitive detector device receiving at any one instant only the light corresponding to a scan of a selected item of graphic material for producing an electrical output signal modulated according to the graphic information traversed by said scan, the scanning means including random access control means for positioning the scanning light spot at the start of each scan according to predetermined coordinates, the scanning means comprising means for moving the light spot from predetermined point to predetermined point, each point being defined independently, whereby scanning is commenced at any desired point on any selected item of graphic material, and the scanning means further comprising means for independently controlling the length of each scan.

* * * * *